United States Patent
Teshima et al.

(10) Patent No.: US 11,550,082 B2
(45) Date of Patent: Jan. 10, 2023

(54) MIRROR WITH INCREASED FORM STABILITY AND LONGEVITY AND A METHOD OF FABRICATING THE SAME

(71) Applicants: MAX-PLANCK-GESELLSCHAFT ZUR FÖRDERUNG DER WISSENSCHAFTEN E.V., Munich (DE); MEDIA LARIO S.R.L., Bosisio Parini (IT)

(72) Inventors: Masahiro Teshima, Unterschleißheim (DE); Razmik Mirzoyan, Unterschleißheim (DE); Guiseppe Valsecchi, Oggiono (IT); Robert Banham, Suffolk (GB)

(73) Assignees: MAX-PLANCK-GESELLSCHAFT ZUR FÖRDERUNG DE WISSENSCHAFTEN E.V., Munich (DE); MEDIA LARIO S.R.L., Bosisio Parini (IT)

( * ) Notice: Subject to any disclaimer, the term of this patent is extended or adjusted under 35 U.S.C. 154(b) by 764 days.

(21) Appl. No.: 16/471,360

(22) PCT Filed: Dec. 21, 2017

(86) PCT No.: PCT/EP2017/084077
§ 371 (c)(1),
(2) Date: Jun. 19, 2019

(87) PCT Pub. No.: WO2018/115276
PCT Pub. Date: Jun. 28, 2018

(65) Prior Publication Data
US 2020/0096682 A1  Mar. 26, 2020

(30) Foreign Application Priority Data
Dec. 21, 2016 (EP) ..................... 16205705

(51) Int. Cl.
*G02B 5/10* (2006.01)
*F24S 23/70* (2018.01)
(Continued)

(52) U.S. Cl.
CPC .......... *G02B 5/10* (2013.01); *B32B 17/10091* (2013.01); *F24S 23/70* (2018.05);
(Continued)

(58) Field of Classification Search
None
See application file for complete search history.

(56) References Cited

U.S. PATENT DOCUMENTS

| 4,422,893 A | 12/1983 | Duchateau et al. |
| 5,316,564 A | 5/1994 | Nakamura et al. |

(Continued)

FOREIGN PATENT DOCUMENTS

| CN | 105246685 | 1/2016 |
| DE | 10 2013 112 378 | 5/2015 |

(Continued)

OTHER PUBLICATIONS

International Search Report and Written Opinion of the International Searching Authority dated Jun. 5, 2018, from International Patent Application No. PCT/EP2017/084077, 18 pages.

*Primary Examiner* — Jennifer D. Carruth
(74) *Attorney, Agent, or Firm* — Staas & Halsey LLP

(57) ABSTRACT

A mirror includes a carrier, a reflecting layer disposed above a main face of the carrier, and a transparent layer disposed above the reflective layer. The carrier includes a base body, and the base body includes one or more of a material comprising a density in a range from 0.1 to 1.0 g/cm³, a porous material, a foamed material, a material comprising a structure containing closed cells, a material comprising a honeycomb structure, or a structure containing carbon fibers.

18 Claims, 8 Drawing Sheets

(51) Int. Cl.
*B32B 17/10* (2006.01)
*G02B 5/08* (2006.01)

(52) U.S. Cl.
CPC ...... *G02B 5/0808* (2013.01); *B32B 2307/416* (2013.01); *B32B 2551/08* (2013.01)

(56) References Cited

U.S. PATENT DOCUMENTS

| | | | |
|---|---|---|---|
| 10,215,892 B1 * | 2/2019 | Pyle | G02B 5/0808 |
| 2013/0114155 A1 | 5/2013 | Eguro | |
| 2014/0158114 A1 * | 6/2014 | Ishida | G02B 26/0825 |
| | | | 359/869 |
| 2016/0238752 A1 | 8/2016 | Wiersema | |

FOREIGN PATENT DOCUMENTS

| | | |
|---|---|---|
| JP | 54-12961 | 1/1979 |
| JP | 4-335301 | 11/1992 |
| JP | 8-152507 | 6/1996 |
| JP | 2010-66291 | 3/2010 |
| WO | 2010/004954 | 1/2010 |
| WO | 2011/162154 | 12/2011 |

* cited by examiner

MIRROR WITH INCREASED FORM STABILITY AND LONGEVITY AND A METHOD OF FABRICATING THE SAME

CROSS REFERENCE TO RELATED APPLICATIONS

This application is a U.S. national stage of International Application No. PCT/EP2017/084077, filed on Dec. 21, 2017. The International Application claims the priority benefit of European Patent Application No. 16 205 705.3 filed on Dec. 21, 2016. Both the International Application and the European Patent Application are incorporated by reference herein in their entirety.

TECHNICAL FIELD

The present disclosure relates to a mirror, in particular a telescope mirror, and to a method for fabricating the same.

BACKGROUND

One of the main problems of the mirrors used in open air conditions like, for examples, mirrors for telescopes as, for example, the Imaging Air Cherenkov Telescopes (IACT), is due to their relatively fast wearing due to adverse weather conditions at desert locations and on high mountain altitudes. Typically, due to their unsatisfactory durability in open air conditions, the mirrors lose significantly their reflectivity after operating in harsh open air conditions. As an example, the reflectivity of the mirrors drops continuously to ¾ of its original level already after 3-4 years. This turns out to be a very important factor, for example, for the Cherenkov Telescope Array (CTA), which is going to use many thousands of square meter area for its envisaged about 100 telescopes of 3 different sizes (23 m, 12 m and 4 m in diameter).

If the mirrors are not well protected, in a time scale of 3-4 years it will become necessary either to produce new mirrors, which will be very expensive, or to take down the mirrors from the telescopes, transport them, prepare them again, transport them again, install them on the telescope and adjust them again. Therefore, long-lifetime mirrors can make the operation of such a large array much more cost and time effective. The same holds true for other telescope mirrors or for mirrors used for other purposes like, for example, solar collectors.

SUMMARY

In accordance with a first aspect of the disclosure a mirror comprises a carrier, a reflecting layer disposed above a main face of the carrier, and a transparent protective layer disposed above the reflective layer, wherein the carrier comprises a base body, and wherein the base body comprises one or more of a material comprising a density in a range from 0.1 to 1.0 g/cm3, a porous material, a foamed material, a material comprising a structure containing closed cells, a material comprising a honeycomb structure, or a structure containing carbon fibers.

In accordance with a second aspect of the disclosure a method for fabricating a mirror comprises providing a carrier, providing a transparent layer, disposing a reflective layer on a main face of the transparent layer, and connecting the transparent layer and the carrier, the reflective layer facing the carrier.

The person skilled in the art recognizes additional features and advantages upon reading the following detailed description and upon giving consideration to the accompanying drawings.

BRIEF DESCRIPTION OF THE DRAWINGS

The accompanying drawings are included to provide a further understanding of examples and are incorporated in and constitute a part of this specification. The drawings illustrate examples and together with the description serve to explain principles of examples. Other examples and many of the intended advantages of examples will be readily appreciated as they become better understood by reference to the following detailed description.

DETAILED DESCRIPTION

Figure 1A:
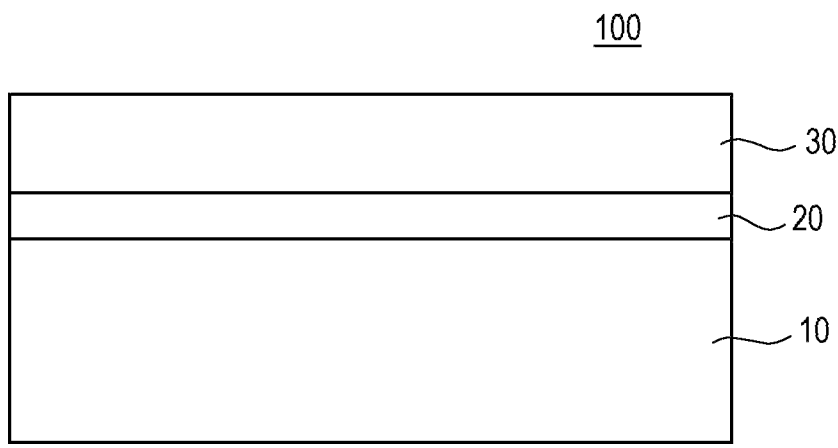
FIG. 1 comprises FIG. 1A and 1B and shows a schematic cross-sectional side view representation (A) and a top view representation of an exemplary mirror according to the first aspect (B).

The aspects and examples are now described with reference to the drawings, wherein like reference numerals are generally utilized to refer to like elements throughout. In the following description, for purposes of explanation, numerous specific details are set forth in order to provide a thorough understanding of one or more aspects of the examples. It may be evident, however, to one skilled in the art that one or more aspects of the examples may be practiced with a lesser degree of the specific details. In other instances, known structures and elements are shown in schematic form in order to facilitate describing one or more aspects of the examples. It is to be understood that other examples may be utilized and structural or logical changes may be made without departing from the scope of the present disclosure. It should be noted further that the drawings are not to scale or not necessarily to scale.

In the following detailed description, reference is made to the accompanying drawings, which form a part hereof, and in which is shown by way of illustration specific aspects in which the disclosure may be practiced. In this regard, directional terminology, such as "top", "bottom", "front", "rear", "back" etc., may be used with reference to the orientation of the figures being described. Since components of described mirrors may be positioned in a number of different orientations, the directional terminology may be used for purposes of illustration and is in no way limiting. It is understood that other aspects may be utilized and structural or logical changes may be made without departing from the scope of the present disclosure. The following detailed description, therefore, is not to be taken in a limiting sense, and the scope of the present disclosure is defined by the appended claims.

In addition, while a particular feature or aspect of an example may be disclosed with respect to only one of several implementations, such feature or aspect may be combined with one or more other features or aspects of the other implementations as may be desired and advantageous for any given or particular application. Furthermore, to the extent that the terms "include", "have", "with" or other variants thereof are used in either the detailed description or the claims, such terms are intended to be inclusive in a manner similar to the term "comprise". The terms "coupled" and "connected", along with derivatives may be used. It should be understood that these terms may be used to indicate that two elements or layers co-operate or interact with each other regardless whether they are in direct physical or electrical contact, or they are not in direct contact with each other. Also, the term "exemplary" is merely meant as an example, rather than the best or optimal. The following detailed description, therefore, is not to be taken in a limiting sense, and the scope of the present disclosure is defined by the appended claims.

Insofar, as a method for fabricating a mirror is described as having a specific order of method steps, it should be mentioned that any other appropriate order of the method steps may be employed by the skilled person. It should further be mentioned that any particular method features or method steps mentioned in connection with a method are to be understood as also disclosing a mirror being fabricated by such method features or method steps, even if such a mirror is not explicitly described or illustrated in the figures. Furthermore any features, remarks, or comments, mentioned in connection with a mirror are to be understood as also disclosing a method feature or method step designating the particular method feature or method step for fabricating the respective feature of the mirror.

Figure 1B:
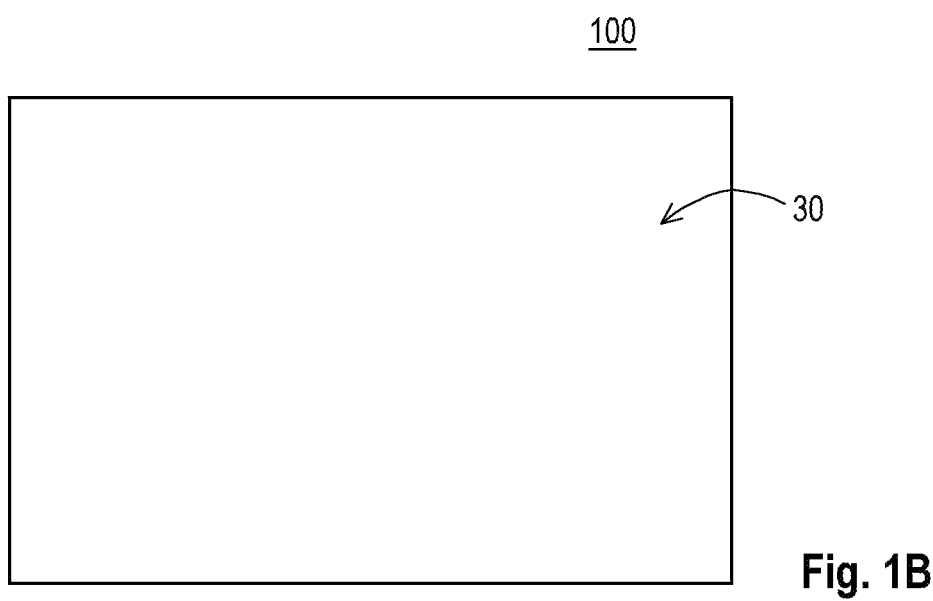

FIG. 1 shows a schematic cross-sectional side view representation of a mirror according to the first aspect. The mirror 100 according to FIG. 1 comprises a carrier 10, a reflective layer 20 disposed above a main face of the carrier 10, and a transparent layer 30 disposed above the reflective layer 20.

In operation of the mirror 100, light rays to be reflected by the mirror 100 come from above the mirror 100, traverse the transparent layer 30, and impinge on the reflective layer 20 which reflects them in a desired manner. The mirror 100 can have a flat or curved surface. If used as a telescope mirror, the mirror 100 will have a curved surface with a predefined radius of curvature so that light bundles will be focused either onto another mirror or lens or onto a detector.

According to an example of the mirror 100 of the first aspect, the mirror 100 is fabricated by providing the carrier 10, providing the transparent layer 30, disposing the reflective layer 20 on a main face of the transparent layer 30, and joining or interconnecting the transparent layer 30 and the carrier 10, the reflective layer 20 facing the carrier 10. According to an example thereof, joining or interconnecting the transparent layer 30 and the carrier 10 comprises any kind of bonding technique like, for example, glueing or adhering by using an adequate glue or adhesive. In particular in the case of glueing between the already coated transparent layer 30 and the carrier 10, a difficulty may be to avoid the formation of air bubbles or remaining small, but still macroscopic corns of dust or dirt in between. One option could be to add microspheres of diameter in a range from 100 µm to 200 µm, in particular around 150 µm, to the glue.

The reflective layer 20 can be applied onto a main face of the transparent layer 30 by, for example, evaporating from an evaporator source, or sputtering, or by (electro-)chemical means. The specific method will depend on the material of the reflective layer 20.

It is thus possible to cover the reflective layer 20 with a relatively thick layer, namely the transparent layer 30 and this should provide a high longevity for such a mirror 200.

According to an example of the mirror 100 of the first aspect, the mirror 100 further comprises a layer of an adhesive or a glue between the carrier 10 and the reflective layer 20.

According to an example of the mirror 100 of the first aspect, the transparent layer 30 comprises a thickness in a range from 20 µm to 500 µm, more specifically from 30 µm to 450 µm, more specifically from 40 µm to 400 µm.

According to an example of the mirror 100 of the first aspect, the reflective layer 20 comprises a thickness in a range from 50 nm to 200 nm, more specifically from 80 nm to 120 nm.

According to an example of the mirror 100 of the first aspect, the transparent layer 30 is, in general, any sort of freely manageable and transportable plate which can be provided with, e.g. coated with the reflective layer 20 and subsequently connected with the carrier 10.

According to an example of the mirror 100 of the first aspect, the transparent layer 30 is a glass layer, in particular a glass plate or a sheet. In particular, the glass plate can be one which is commercially available and, for example, produced by glass-manufacturing companies like, for example, Schott and/or Corning, known under the name of Ultra-Thin Glass.

According to an example of the mirror 100 of the first aspect, the transparency of the transparent layer 30 refers in general to a high or at least partial transparency from ultraviolet to infrared or at least in the visible spectrum. More specifically, it refers to a spectral transmittance of the transparent layer of at least 90% in at least a major part of the light spectrum from ultraviolet to infrared, in particular from 400 nm to 1000 nm. According to a further example thereof, a spectral transmittance in the UV or, e.g. at 300 nm, is at least 50%, more specifically at least 60%, more specifically at least 70%, more specifically at least 80%.

According to an example of the mirror 100 of the first aspect, the reflectivity of the reflective layer 20 refers to a reflectivity in a spectral range from 400 nm to 1000 nm which is at least 80%, more specifically at least 90%.

According to an example of the mirror 100 of the first aspect, the material of the transparent layer 30 is a high-silica glass or a fused quartz glass.

According to an example of the mirror 100 of the first aspect, the reflective layer 20 comprises or consists of Al or Ag. While the pure Al shows a peak reflectivity of about 90%, Ag may show a reflectivity of 96% to 98% for wavelengths ≥500 nm and at least a better reflectivity than Al starting from wavelength of 400 nm. Thus, when one integrates the entire spectrum of, for example, Cherenkov light from atmospheric air showers in the typical wavelength range of 300 nm to 650 nm, despite the fact that Al reflects better in the near UV range, i.e. 300 nm to 400 nm, the Al and Ag mirrors will collect a very comparable amount of light.

According to an example of the mirror 100 of the first aspect, the reflective layer 20 comprises a dielectric material, more specifically a stack of layers of different dielectric materials.

According to an example of the mirror 100 of the first aspect, the mirror 100 comprises a diameter or a maximum length along one direction being at least 0.5 m, more specifically at least 1.0 m, more specifically at least 2.0 m (as for example, the 23 m diameter LST telescopes of CTA are using mirrors of size around 2 m). In case of a circular mirror, these numbers would refer to the diameter of the circle, and in case of a square or rectangular shaped mirror, such as that shown in FIG. 1B, these numbers would refer to either one or the longer one of the two side edges of the mirror.

According to an example of the mirror 100 of the first aspect, the mirror 100 comprises a specified curvature depending on the intended use of the mirror. In particular, if one thinks of mirrors for the Cherenkov Telescope Array (CTA), the radius of curvature of each one of the mirrors is in a range from 1 m to around 60 m (as for example, the 23 m diameter LST telescopes of CTA are using mirrors with the radius of curvature of around 60 m), more specifically in a range from 2 m to 6 m, more specifically in a range from 3 m to 5 m, more specifically around 4 m. In case of other applications of the mirror like, for example, solar collectors, the radius of curvature can also be below 1 m. Depending on the intended use of the mirror, the mirror may also comprise a parabolic or cylindrical curvature. For example, the solar thermal huge array in California is using mirrors of cylindrical shape in the focus of which a long tube is located, filled with the melted salt at around 750° C. is flowing. There is no need for the telescope to follow the sun as the tube or its center axis is always in focus.

According to an example of the mirror 100 of the first aspect, the materials of the carrier 10 and the transparent layer 30 may be chosen such that their respective coefficients of thermal expansion (CTE) are equal or a possible deviation of the CTEs is below a predetermined threshold. As will be outlined by an example further below, the carrier 10 may comprise a base body and one or more layers attached to the main surfaces of the base body. In such a case, for example, the material of the base body may be chosen such that its CTE is either equal to the CTE of the transparent layer 20 or a difference between the CTEs amounts to no more than 10% of the respective higher CTE, more specifically no more than 5%, more specifically no more than 2%, more specifically no more than 1%.

According to an example of the mirror 100 of the first aspect, the carrier 10 comprises a base body and one or more layers disposed on the base body, in particular on the main surfaces of the base body. An example thereof will be shown and explained further below.

According to an example of the mirror 100 of the first aspect, the mirror 100 further comprises one or more additional layers disposed between the reflective layer 20 and the transparent layer 30, the one or more additional layers being configured to improve one or more of the hardness, durability and resistance of the reflective layer 20. According to a further example thereof, the one or more additional layers may comprise a chromium layer, an $SiO_2$ layer, in particular a quartz layer, and a tantalum-pentoxide layer. Such layers may be applied onto the main surface of the transparent layer 30 before in a last step the reflective layer 20 is applied on top of the layer stack.

According to an example of the mirror 100 of the first aspect, the mirror 100 comprises one or more additional layers disposed on an upper surface of the transparent layer 30, in particular a layer which functions as an anti-reflection layer for light in the spectrum from ultraviolet to infrared, in particular in the visible part of the spectrum.

According to an example of the mirror 100 of the first aspect, the upper surface of the transparent layer 30 may be flat as shown in FIG. 1. According to another example the upper surface may comprise a structure which can be a regular or an irregular structure. The structure may be configured such that it (further) reduces unwanted reflection of light rays and instead assists so that more light rays reach the reflective layer 20.

Figure 2:
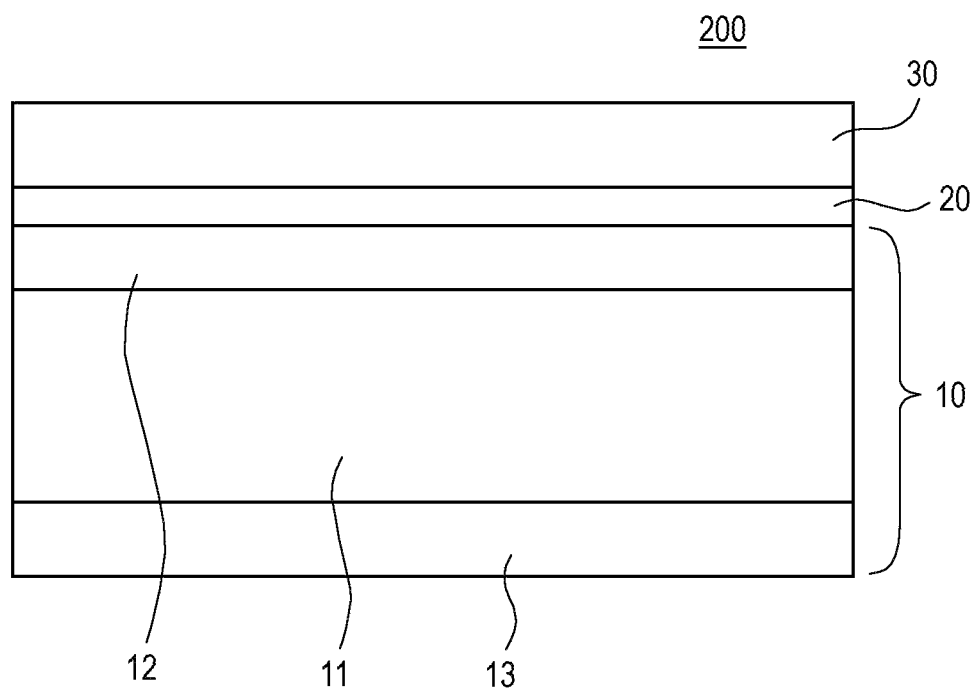
FIG. 2 shows a schematic cross-sectional side view representation of an exemplary mirror of the first aspect according to an example in which the mirror comprises a carrier comprising a base body and a front layer and a rear layer attached to front and rear surfaces of the base body, respectively.

FIG. 2 shows an example of a mirror according to the first aspect. The mirror 200 of FIG. 2 comprises a carrier 10, a reflective layer 20 disposed above a main face of the carrier 10, and a transparent layer 30 disposed above the reflective layer 20.

According to the example of the mirror 200 of FIG. 2, the carrier 10 comprises a base body 11, a front layer 12 applied to an upper main face of the base body 11, and a rear layer 13 applied to a lower main face of the base body 11.

According to an example of the mirror 200 of FIG. 2, one or both of the front and rear layers 12 and 13 can be comprised of a glass plate. Alternatively one or both of the front and rear layers can be comprised of a plastic material or any other suitable material like, for example, any non-metallic material. The front and rear layers 12 and 13 serve to stabilize the carrier 10 but at least in principle they can also be omitted so that the carrier would consist only of the base body 11.

According to the example of the mirror 200 of FIG. 2, the base body 11 comprises a density in a range from 0.1 to 3.0 $g/cm^3$ (for example, in case of solid glass it will have density of 2.7 $g/cm^3$), in particular in a range from 0.1 to 1.0 $g/cm^3$. A bulk density of the base body 11 being in this range ensures on the one hand that the mechanical strength is strong enough to be suitable as a supporting base of the mirror, and on the other hand the body weight of the mirror is small enough so that the mirror is not subject to the problem of the mechanical deformation by its own gravity.

According to an example of the mirror 200 of FIG. 2, the base body 11 comprises a thickness in a range from 20 mm to 60 mm, more specifically from 30 mm to 50 mm, more specifically from 35 mm to 45 mm.

According to the example of the mirror 200 of FIG. 2, one or more of the front layer 12 and the rear layer 13 comprise a thickness in a range from 1 mm to 3 mm, more specifically from 1.5 mm to 2.5 mm.

According to the example of the mirror 200 of FIG. 2, the base body 11 comprises one or more of a porous material, a foamed material, a material comprising a structure containing closed cells, a material comprising a honeycomb structure, or a structure containing carbon fibers, or the base body 11 simply being a solid body.

According to a further example thereof, the base body 11 may comprise an aluminum honeycomb structure, which is a regular arrangement of honeycomb cells formed by walls of aluminum material.

According to another example thereof, the base body 11 comprises a porous foamed body of fused quartz glass produced by heating a powder of fused quartz glass consisting of silicon-dioxide having hydroxyl groups on an atmosphere of ammonia, said porous foamed body having mainly closed cells.

According to the example of the mirror 200 of FIG. 2, the front layer 12 and the rear layer 13 are both attached to the base body 11 by means of an adhesive or glue so that on both sides of the base body 11 there is an adhesive layer disposed between the upper surface of the base body 11 and the front layer 12 and between the lower surface of the base body 11 and the rear layer 13.

As a result, the reflective layer 20 is sealed by two relatively thick layers, namely the front layer 12, in particular front glass plate 12, and the transparent layer 30 and this should provide a high longevity for such a mirror 200.

In principle, it is also possible to omit either one or both of the front layer 12 and the rear layer 13 or to replace either one or both them by other layers of comparable material properties.

Figure 3:
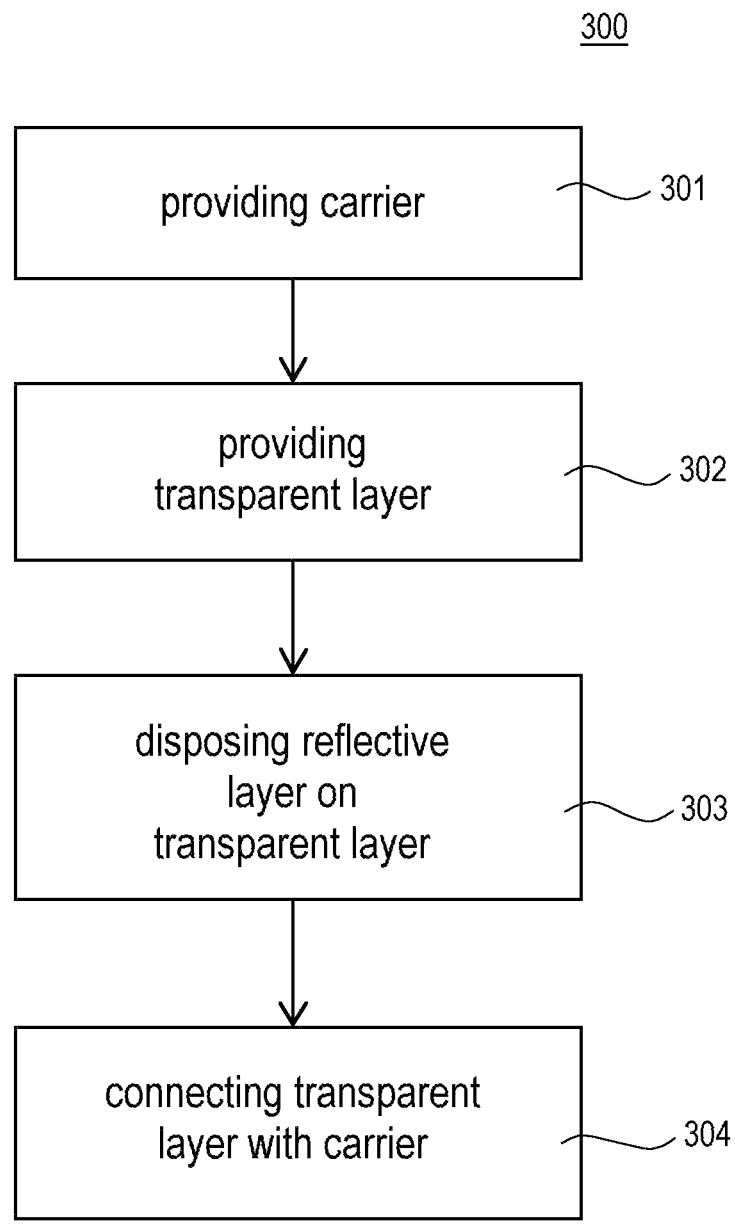
FIG. 3 shows a flow diagram for illustrating a method for fabricating a mirror according to a second aspect.

FIG. 3 shows a flow diagram of a method for fabricating a mirror according to a second aspect. The method 300 comprises providing a carrier (301), providing a transparent layer (302), disposing a reflective layer on a main face of the transparent layer (303), and connecting the transparent layer with the carrier, the reflective layer facing the carrier (304).

According to an example of the method of the second aspect, providing a carrier comprises providing a base body which is disposed between a front layer and a rear layer. According to a further example thereof, a base body is fabricated as described before and a front layer is attached to an upper main surface of the base body and a rear layer is attached to a lower main surface of the base body. The front layer and the rear layer may be attached to the base body by applying a glue or adhesive and then pressing the layers onto the respective main surfaces of the base body.

According to an example of the method of the second aspect, attaching the transparent plate to a main face of the carrier is also performed by applying a glue or adhesive and then bonding the transparent plate to the carrier.

According to an example of the method of the second aspect, a desired curvature is imparted to the mirror by placing the assembly obtained after bonding the transparent plate to the carrier against a convex-shaped polished master of exact needed curvature. An example thereof will be illustrated and explained below. Another possibility will be to put the composite mirror onto a well-sealed substrate inside a sealed box and either to produce a pressure on the transparent layer side inside the box or alternatively and similarly, to produce a negative pressure, intake pressure, or vacuum from the opposite side, the effect will be the same, the mirrors will get the parabolic shape.

Further examples of a method according to the second aspect can be formed by combining with any example or detail that was presented before in connection with a mirror of the first aspect and FIGS. 1 and 2.

FIG. 4 comprises FIG. 4A to 4F and illustrates an exemplary method for fabricating a mirror according to the second aspect. It should be mentioned again that the drawings are not to scale.

Figure 4A:
FIG. 4 comprises FIG. 4A-4F and shows schematic cross-sectional side view representations for illustrating a method for fabricating a mirror such as that shown in FIG. 2 with a curved surface.

FIG. 4A shows the providing of a transparent layer 30, in particular a glass plate such as that described before by means of different examples. The form and size of the transparent layer 30 can be the same as of the mirror to be fabricated.

Figure 4B:
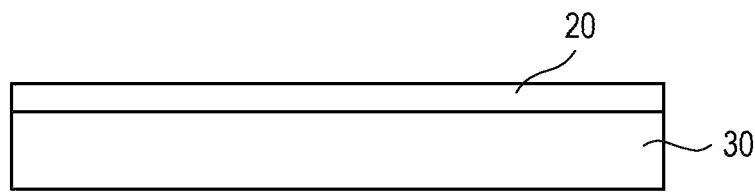

FIG. 4B shows the disposing of a reflective layer 20 onto the transparent plate 30. As was explained before, the reflective layer 30 will be deposited by any suitable method which i.a. depends on the material of the reflective layer 30. In case of Al, for example, the reflective layer can be deposition by evaporation or by sputtering. The thickness can be in a range from 80 nm to 120 nm, more specifically from 90 nm to 110 nm.

Figure 4C:
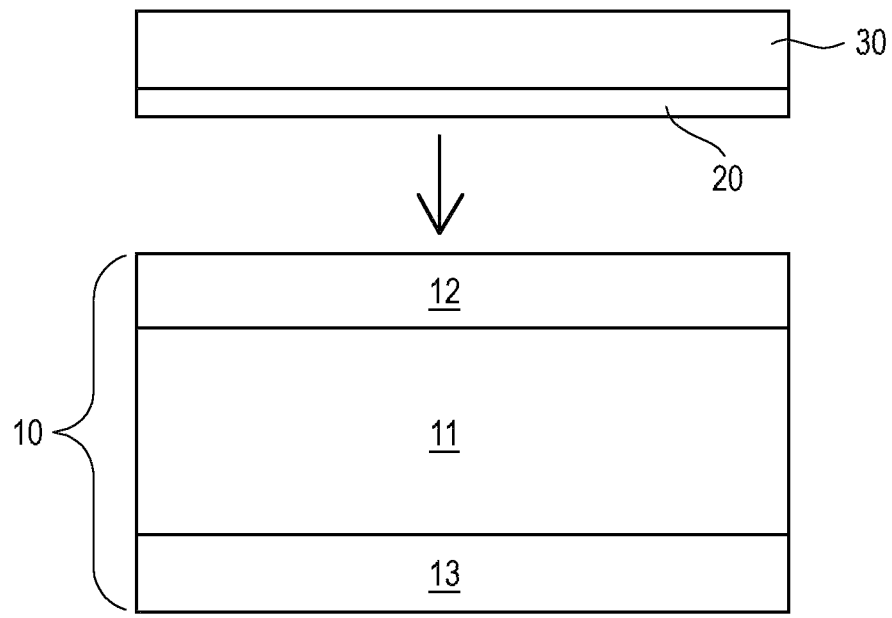

FIG. 4C shows bonding the transparent plate 30 with the reflective layer 20 onto a carrier 10, i.e. onto an upper surface of a front glass plate 12 of the carrier 10, by, for example, gluing or adhering. The carrier 10 comprises a base body 11, a front glass plate 12 and a rear glass plate 13.

Figure 4D:
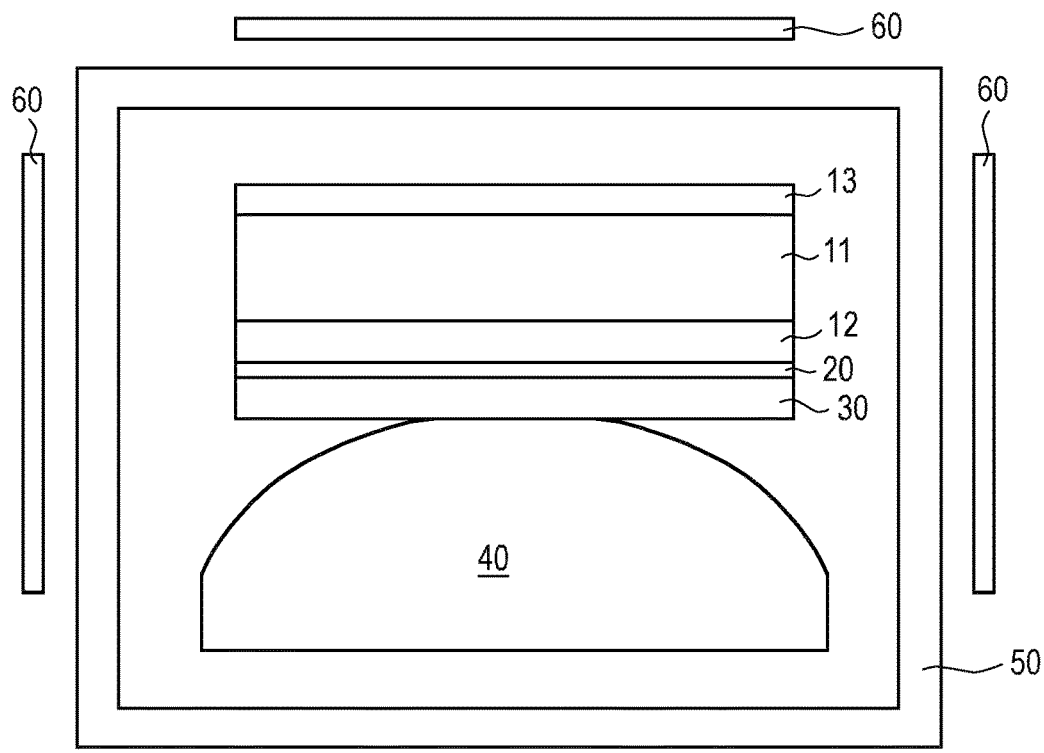

FIG. 4D shows providing a mould 40 comprising an upper surface having a curvature with a shape which is complementary to the curvature desired for the mirror. The mould 40 is manufactured of a suitable material to minimize the eventual CTE mismatch between it and the mirror assembly. The mould 40 is placed within a muffle 50 and the mirror assembly is placed above the mould 40. The muffle 50 is placed inside an oven indicated by heater elements 60.

Figure 4E:
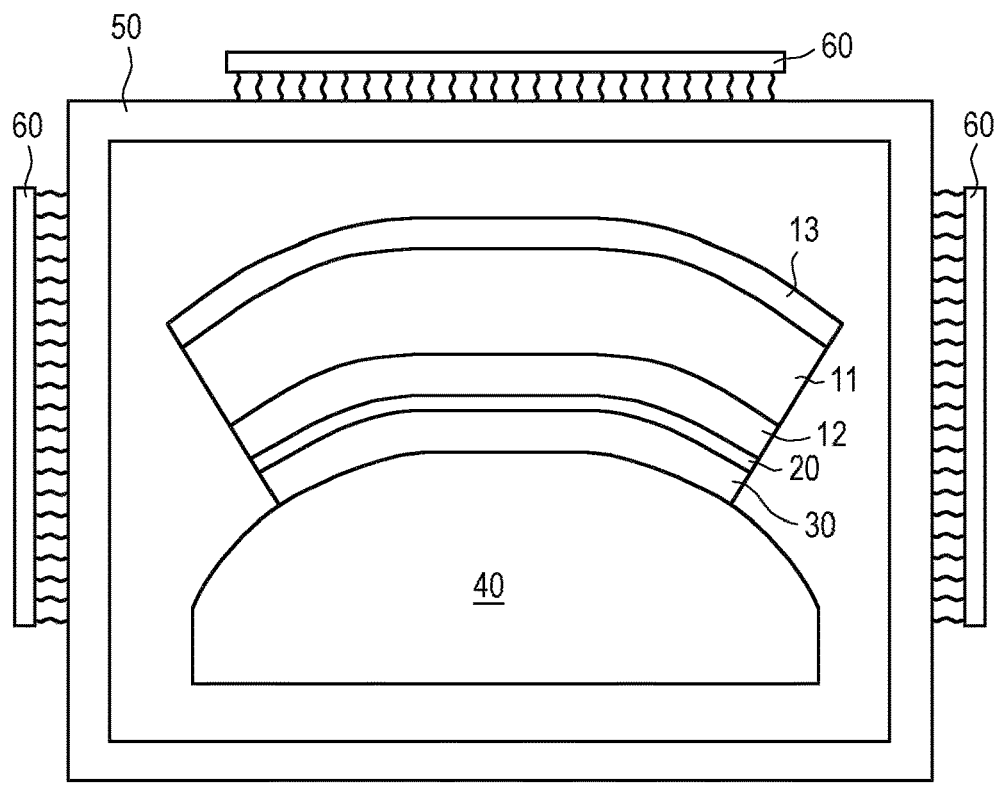

FIG. 4E indicates the activation of the heater elements 60 and a thermal cycle tailored to the specific conditions is then applied with predetermined warming-up, holding times and cooling rates. During the process a homogeneous pressure is applied onto the mirror assembly so to force it against the surface of the mould 40. This approach ensures the full contact of the mirror assembly against the mould 40.

FIG. 4E shows the end of the thermal cycle at which the mirror assembly has made entire contact with the surface of the mould 40 and thus copied the shape of the mould 40. Thereafter, a step of cooling and stiffening of the shaped mirror assembly follows.

Figure 4F:
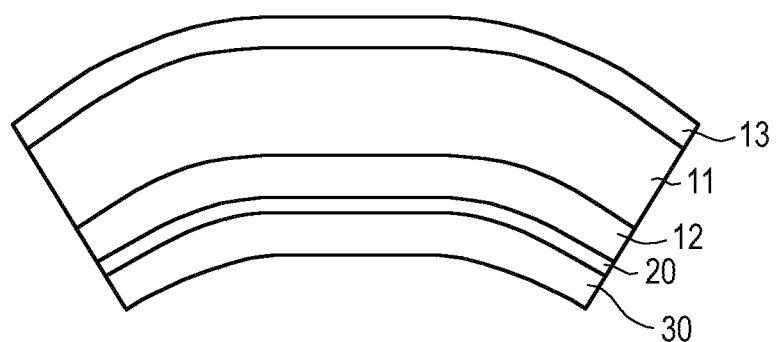

FIG. 4F shows the mirror assembly removed out of the oven and out of the muffle 50.

FIG. 5 comprises FIG. 5A to 5F and illustrates another exemplary method for fabricating a mirror according to the second aspect.

Figure 5A:
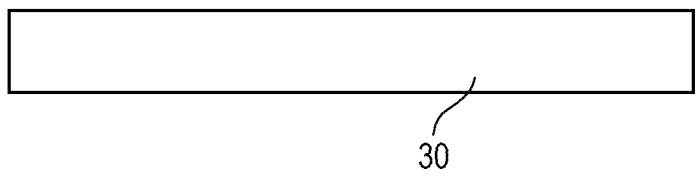
FIG. 5 comprises FIG. 5A-5F and shows schematic cross-sectional side view representations for illustrating a method for fabricating a mirror such as that shown in FIG. 2 with a curved surface.
Figure 5B:
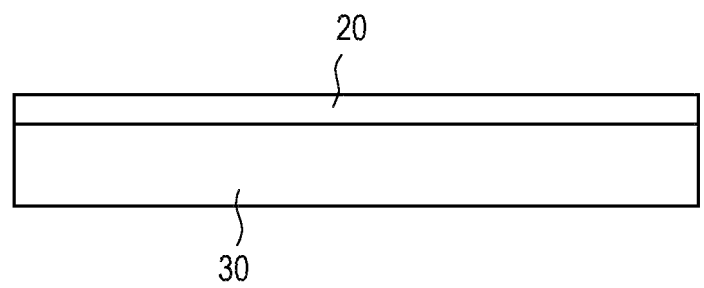
Figure 5C:
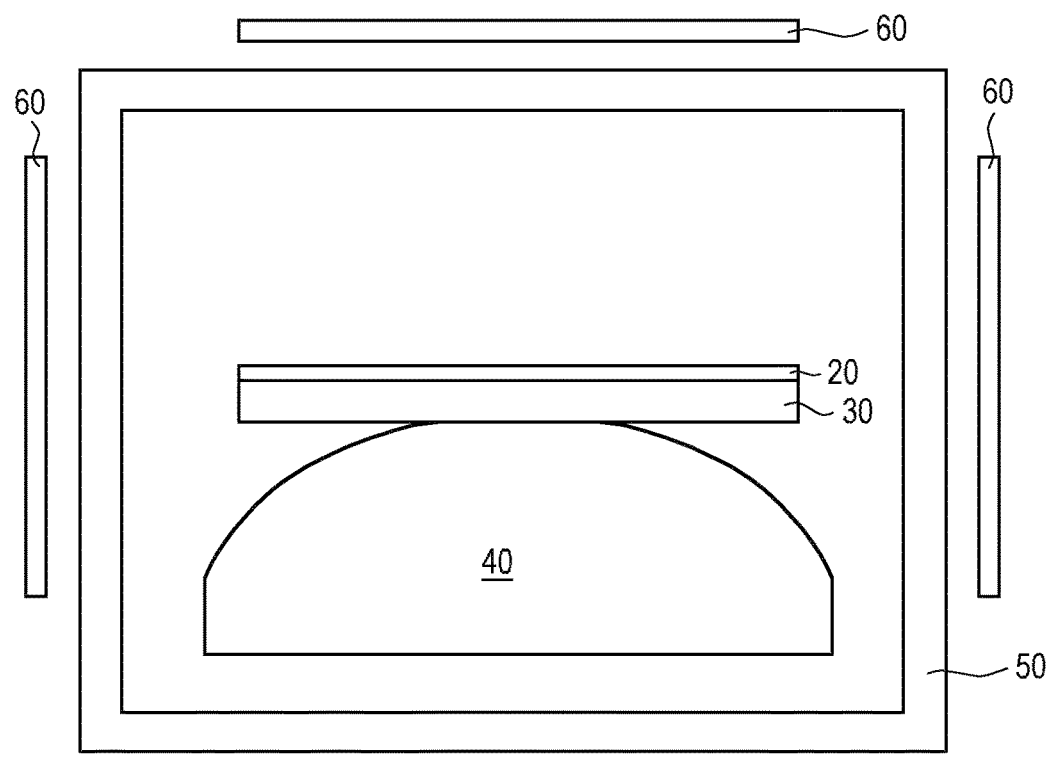
Figure 5D:
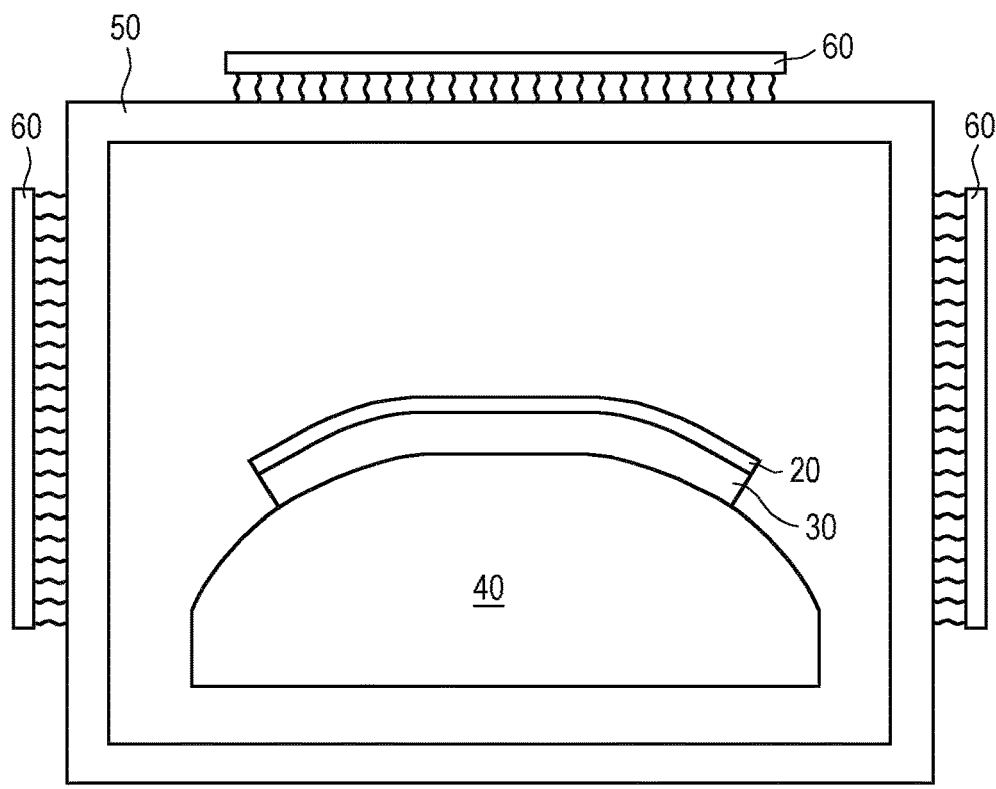
Figure 5E:
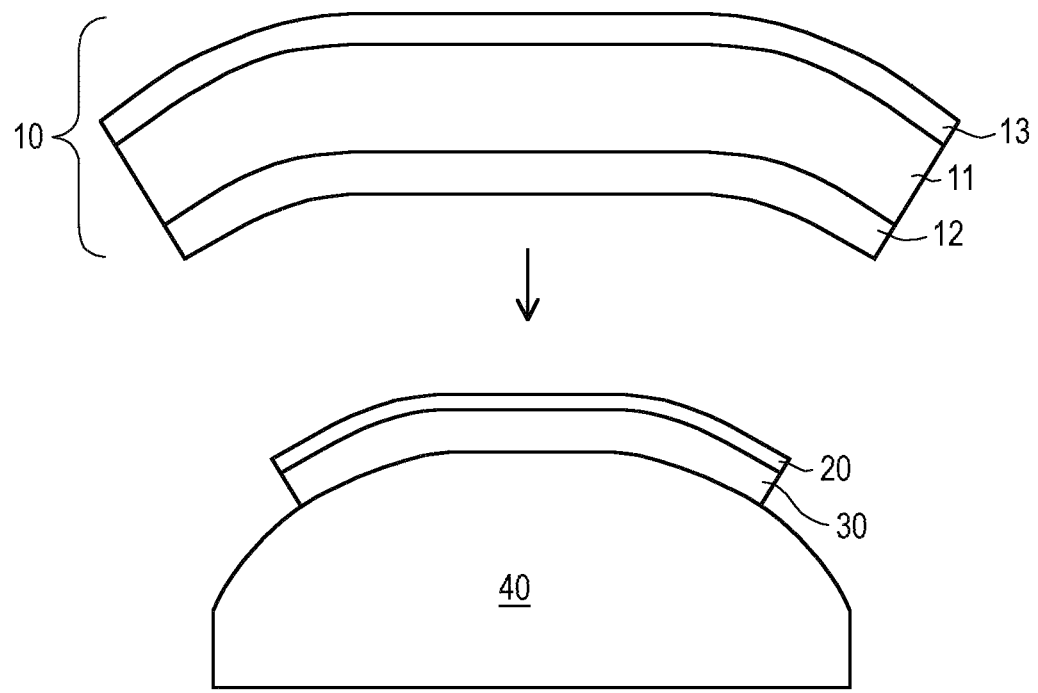
Figure 5F:
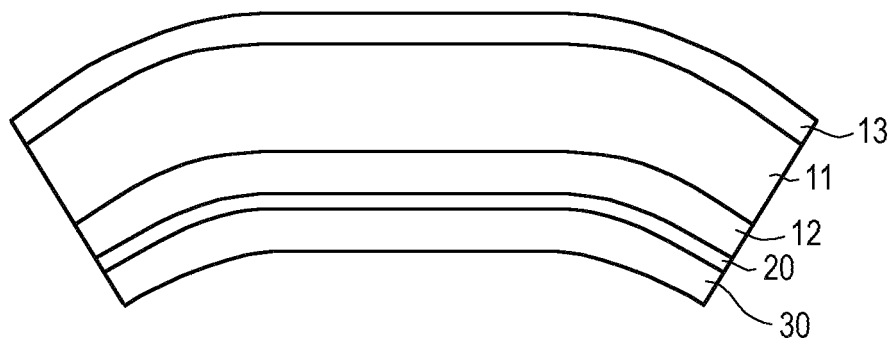

FIGS. 5A and 5B may contain the same steps as FIGS. 4A and 4B. A main difference to the method of FIG. 4 is that according to FIG. 5C only the assembly of the transparent layer 30 and the reflective layer 20 is placed on the mould 40 and thereafter according to FIG. 5D caused to substantially conform to the surface shape of the mould 40, in particular in the same way as was described above in connection with FIG. 4E. Thereafter according to FIG. 5E a carrier 10, in particular a carrier 10 comprising a a base body 11, a front glass plate 12 and a rear glass plate 13, is attached to an upper surface of the reflective layer 20, in particular in a state when the assembly of the transparent layer 30 and the reflective layer 20 is still resting on the mould 40 and furthermore in particular in the same way as was described above in connection with FIG. 4C. The carrier 10 is preformed in such a way that it comprises a curved form with the same radius of curvature as the assembly of the transparent layer 30 and the reflective layer 20. FIG. 5F shows the mirror assembly removed out of the oven and out of the muffle 50.

According to a further aspect of the disclosure a mirror comprises a carrier such as that described above, a reflecting layer such as that described above and disposed above a main face of the carrier, and a transparent protective layer such as that described above and disposed above the reflective layer, wherein the carrier comprises a base body such as that described above. The mirror further comprises a first layer such as that described above and disposed on a first main face of the base body and between the base body and the reflecting layer. The mirror according to the further aspect may further comprise a second layer such as that described above and disposed on a second main face of the base body opposite to the first main face. The mirror according to the further aspect may further comprise any one of the various features, examples or sub-claims as disclosed herein in connection with the mirror of the first aspect.

The mirror according to the present disclosure or any one of the examples described throughout the disclosure can be used for telescopes, in particular (imaging) Cerenkov telescopes. They can also be used for other purposes like solar collectors, or also for reflective windows of houses, in particular skyscrapers, or also for any other applications in which mirrors or reflective surfaces are employed.

Another application would be one in which instead of a reflective layer a specific absorbing layer is employed so that one could no more speak of a mirror. The absorbing layer could be such that it selectively absorbs light coming from below and let through only the desired wavelength range.

While the disclosure has been illustrated and described with respect to one or more implementations, alterations and/or modifications may be made to the illustrated examples without departing from the spirit and scope of the appended claims. In particular with regard to the various functions performed by the above described components or structures (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure.

The invention claimed is:

1. A mirror, comprising:
   a carrier;
   a reflecting layer disposed above a main face of the carrier; and
   a transparent layer disposed above the reflective layer, wherein
   the carrier comprises a base body,
   the base body comprises one or more of a material comprising a density in a range from 0.1 to 1.0 g/cm$^3$, a porous material, a foamed material, a material comprising a structure containing closed cells, a material comprising a honeycomb structure, or a structure containing carbon fibers, and
   the transparent layer comprises a thickness in a range from 20 µm to 500 µm.

2. The mirror according to claim 1, wherein the telescope mirror comprises a radius of curvature in a range from 1 m to 60 m.

3. The mirror according to claim 1, wherein the reflecting layer is directly connected with the carrier by any kind of bonding technique.

4. The mirror according to claim 1, wherein the carrier further comprises one or more layers disposed on the base body.

5. The mirror according to claim 4, wherein
   the one or more layers comprise a front layer and a rear layer, and
   the base body is disposed between the front layer and the rear layer.

6. The mirror according to claim 5, wherein one or more of the front layer and the rear layer is comprised of a glass plate.

7. The mirror according to claim 5, wherein one or more of the front layer and the rear layer comprise a thickness in a range from 1 mm to 3 mm.

8. The mirror according to claim 1, wherein the transparent layer is a glass layer.

9. The mirror according to claim 1, wherein the reflective layer comprises Al or Ag or a dielectric material.

10. The mirror according to claim 1, wherein the reflective layer comprises a stack of layers of different dielectric materials.

11. The mirror according to claim 1, wherein the base body comprises a thickness in a range from 20 mm to 60 mm.

12. The mirror according to claim 1, wherein
    the material of the base body is chosen such that a difference between the respective coefficients of thermal expansion (CTE) of the base body and the transparent layer amounts to no more than 10% or 5% or 2% or 1% of the respective higher CTE.

13. The mirror according to claim 1, further comprising
    one or more additional layers disposed between the reflective layer and the transparent layer, the one or more additional layers being configured to improve one or more of the hardness, durability and resistance of the reflective layer.

14. The mirror according to claim 13, wherein
    the one or more additional layers comprise one or more of a chromium layer, an SiO2 layer, a quartz layer, and a tantalum-pentoxide layer.

15. The method according to claim 14, wherein
    the base body comprises one or more of a material comprising a density in a range from 0.1 to 1.0 g/cm3, a porous material, a foamed material, a material comprising a structure containing closed cells, a material comprising a honeycomb structure, or a structure containing carbon fibers.

16. A method for fabricating a mirror, the method comprising:
    providing a transparent layer comprising a thickness in a range from 20 µm to 500 µm;
    disposing a reflective layer on a main face of the transparent layer;
    providing a carrier; and
    connecting the transparent layer and the carrier, the reflective layer facing the carrier.

17. The method according to claim 16 further comprising:
    providing a carrier including a base body which is disposed between a front layer and a rear layer, and
    choosing the material of the base body such that a difference between the respective coefficients of thermal expan-sion (CTE) of the base body and the transparent layer amounts to no more than 10% or 5% or 2% or 1% of the respective higher CTE.

18. The method according to claim 16, further comprising
    connecting the transparent layer and the carrier by gluing and adding microspheres of diameter in a range from 100 µm to 200 µm to the glue.

* * * * *

UNITED STATES PATENT AND TRADEMARK OFFICE
CERTIFICATE OF CORRECTION

PATENT NO. : 11,550,082 B2
APPLICATION NO. : 16/471360
DATED : January 10, 2023
INVENTOR(S) : Masahiro Teshima et al.

It is certified that error appears in the above-identified patent and that said Letters Patent is hereby corrected as shown below:

In the Claims

Column 10, Line 25:
In Claim 15, delete "method" and insert --mirror--.

Column 10, Line 50:
In Claim 17, delete "expan-sion" and insert --expansion--.

Signed and Sealed this
Seventh Day of March, 2023

Katherine Kelly Vidal
*Director of the United States Patent and Trademark Office*